US007600025B2

(12) United States Patent
Lewin et al.

(10) Patent No.: US 7,600,025 B2
(45) Date of Patent: *Oct. 6, 2009

(54) EXTENDING AN INTERNET CONTENT DELIVERY NETWORK INTO AN ENTERPRISE

(75) Inventors: Daniel M. Lewin, Charlestown, MA (US); Anne E. Lewin, legal representative, Charlestown, MA (US); Charles J. Neerdaels, Aptos, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 162 days.

This patent is subject to a terminal disclaimer.

(21) Appl. No.: 11/507,630

(22) Filed: Aug. 21, 2006

(65) Prior Publication Data

US 2006/0282522 A1    Dec. 14, 2006

Related U.S. Application Data

(63) Continuation of application No. 10/041,031, filed on Jan. 7, 2002, now Pat. No. 7,096,266.

(60) Provisional application No. 60/260,310, filed on Jan. 8, 2001.

(51) Int. Cl.
*G06F 15/173* (2006.01)
(52) U.S. Cl. .................. 709/226; 709/218; 709/223
(58) Field of Classification Search ......... 709/201–207, 709/216–219, 223–226
See application file for complete search history.

(56) References Cited

U.S. PATENT DOCUMENTS 6,108,703 A * 8/2000 Leighton et al. ............ 709/226

| | | | |
|---|---|---|---|
| 6,832,222 B1 * | 12/2004 | Zimowski | 707/9 |
| 7,096,266 B2 * | 8/2006 | Lewin et al. | 709/226 |
| 2004/0193695 A1 * | 9/2004 | Salo et al. | 709/216 |

FOREIGN PATENT DOCUMENTS

| | | | |
|---|---|---|---|
| EP | 0817444 A3 * | 12/2000 | |
| WO | WO 0074347 A1 * | 12/2000 | |
| WO | WO 02054699 A2 * | 7/2002 | |
| WO | WO 02054699 A3 * | 7/2002 | |

* cited by examiner

*Primary Examiner*—Yasin M Barqadle
(74) *Attorney, Agent, or Firm*—David H. Judson

(57) ABSTRACT

An Internet content delivery network deploys one or more CDN server regions in an enterprise and manages those regions as part of the Internet CDN. In one aspect of the invention, a CDN service provider (CDNSP) deploys one or more CDN regions behind an enterprise's corporate firewall(s). The regions are used to deliver Internet content—content that has been tagged or otherwise made available for delivery over the Internet from the CDN's content servers. This content includes, for example, content that given content providers have identified is to be delivered by the CDN. In addition, the enterprise may tag intranet content, which is then also served from the CDN regions behind the firewall. Intranet content remains secure by virtue of using the enterprise's existing security infrastructure. In accordance with another aspect of the invention, the CDNSP implements access controls and deploys one or more CDN regions outside an enterprise's firewall(s) such that intranet content can be served from regions located outside the firewall(s). In this embodiment, the CDNSP can provide granular control, such as permissions per groups of users. In this way, the CDNSP, in effect, extends a conventional virtual private network (VPN) to all or a portion of the ICDN, thereby enabling the CDNSP to use multiple regions and potentially thousands of content servers available to serve the enterprise's internal content. In addition to making internal content available from the edge of the network, the CDNSP provides a mechanism by which an enterprise may share secure data with its business partner(s) without setting up any special infrastructure.

8 Claims, 7 Drawing Sheets

EXTENDING AN INTERNET CONTENT DELIVERY NETWORK INTO AN ENTERPRISE

This application is a continuation of prior application Ser. No. 10/041,031, filed Jan. 7, 2002 now U.S. Pat. No. 7,096,266, which application was based on Ser. No. 60/260,310, filed Jan. 8, 2001.

BACKGROUND OF THE INVENTION

1. Technical Field

The present invention relates generally to deploying content delivery servers in or near an enterprise environment and managing those servers as part of an Internet content delivery network (ICDN).

2. Description of the Related Art

It is well-known to deliver digital content (e.g., HTTP content, streaming media and applications) using an Internet content delivery network (ICDN). A content delivery network or "CDN" is a network of geographically distributed content delivery nodes that are arranged for efficient delivery of content on behalf of third party content providers. A request from a requesting end user for given content is directed to a "best" replica, where "best" usually means that the item is served to the client quickly compared to the time it would take to fetch it from the content provider origin server.

Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet network access points, Internet Points of Presence, and the like) for delivering copies of content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system. A well-known commercial CDN service that provides web content and media streaming is provided by Akamai Technologies, Inc. of Cambridge, Mass.

Enterprises have begun to explore the desirability of implementing content delivery infrastructures to address several problems. Currently, enterprise users typically experience slow and expensive access to Internet content. Slow access to business critical data available on the Internet hurts productivity, and the cost of providing good access, e.g., by building bigger networks and by deploying and managing caching infrastructure, is large. In addition, many IT organizations cannot deliver the required quality of service for Internet content delivery due to lack of talent and expertise. Yet another reason corporations are exploring CDNs is because of the slow, expensive and often cumbersome access to and within the entity's intranet. As corporate intranets quickly become a critical component of business processes in many large companies, fast and efficient access to the data and applications on the intranet is a high priority for many IT departments. Nevertheless, current intranet delivery solutions are inadequate; moreover, potential solutions, e.g., by building bigger internal networks, deploying and managing caches, and distributing application front ends, are extremely expensive. To address these deficiencies, several large software vendors are attempting to build ecosystems to provide web-based front ends to many enterprise applications, however, distributing these applications from front ends efficiently, in of itself, will be a critical IT problem that current technologies do not address. Finally, enterprises are considering CDN technology due to slow, expensive access to business partner applications and information provided by current techniques and solutions. Business-to-business applications, such as ordering, inventory, and pricing management between business partners, is done today by linking partners with a physical network. These applications are moving to the Internet/intranet, and the need to link business partners together in an efficient way with web-based front ends is another critical IT problem that is not addressed by today's solutions.

BRIEF SUMMARY OF THE INVENTION

According to the present invention, an Internet content delivery network is extended into an enterprise to create a flexible, uniform platform that preferably is deployed both on the Internet and inside of corporations (or other business entities). Preferably, the same software and systems are deployed on the Internet CDN and inside the enterprise. By having only one technology that encompasses both the Internet and the corporate network (LAN, WAN, or the like), the resulting platform can be leveraged to provide new business services to the enterprise in a more efficient and cost-effective manner. Managing the same infrastructure is quite efficient, and by deploying the same software and systems on the ICDN and inside the enterprise, the ICDN can seamlessly deliver Internet content in the enterprise and, with suitable security, it can deliver intranet content over the Internet.

Internet CDNs deliver content for participating content providers from surrogate origin servers typically located at edge networks. Such publicly-available content is referred to herein as ICDN content. In contrast, internal enterprise content, or ECDN content, generally is non publicly-available content (in whatever format) that an enterprise desires to make available to permitted users within the enterprise or a third party partner of the enterprise. According to the invention, CDN servers are deployed within or outside an enterprise firewall and are selectively used as surrogate origin servers for ICDN content and/or for hosting/delivering ECDN content. More specifically, a particular CDN server deployed and managed in this manner may be used to serve (a) enterprise content (in which case the server is referred to as an ECDN server with respect to such ECDN content) and/or (b) ICDN content (in which case it is referred to an an ICDN server with respect to such ICDN content) of behalf of participating CDN content providers.

In a first embodiment, the CDNSP locates at least one content server region (comprising one or more content servers, where multiple servers may share a common back-end) inside an enterprise's firewall. Thus, for example, the CDN content servers are located on the corporate LAN, perhaps side-by-side with other servers in the enterprise infrastructure. When such servers are located inside the enterprise firewall, they are ECDN servers but are also deemed to be "ICDN-aware" because, according to the invention, they can be used as surrogate origin servers to serve ICDN content from participating content providers that otherwise use the ICDN. Thus, in this embodiment, the CDN servers are used to deliver both Internet content otherwise available from the ICDN as well as intranet content that is tagged or otherwise made available for delivery over those servers. In a second embodiment, the CDNSP locates its content server region topologically (and perhaps geographically) near where the enterprise connects to the Internet but not within the enterprise firewall itself. Thus, for example, CDN content servers are located in the demilitarized zone (DMZ) just outside the corporate firewall or at a nearby (topologically-speaking) network access point. With appropriate authentication and access control in place, these ICDN servers can be used to serve intranet content. As such, these ICDN servers are also "ECDN-aware."

Thus, according to the present invention, ECDN servers within an enterprise firewall are ICDN-aware (and, thus, can act as surrogate origin servers to host and serve ICDN content) while ICDN servers topologically near an enterprise firewall are ECDN-aware (and, thus, can host and serve ECDN content). In a particular embodiment, both ICDN-aware ECDN servers and ECDN-aware ICDN servers are provided, and the CDNSP provides a managed service for the ICDN content/servers and, optionally, for the ECDN content/servers.

The CDNSP deploys one or more CDN regions behind an enterprise's firewall(s), or the enterprise may deploy such regions. The regions are used to deliver ICDN content migrated to the ICDN by participating content providers. In addition, the enterprise may tag intranet content, which is then also served from the CDN regions behind the firewall. Intranet content remains secure by virtue of using the enterprise's existing security infrastructure. Alternatively, the CDNSP implements access controls and deploys one or more CDN regions outside an enterprise's firewall(s) such that, in addition to using those regions for ICDN content, intranet content can be served as well (to authenticated and authorized users). In this embodiment, the CDNSP provide granular control, such as permissions per groups of users. In this way, the CDNSP, in effect, extends a conventional virtual private network (VPN) to all or a portion of the ICDN, thereby enabling the CDNSP to use multiple regions and potentially thousands of content servers available to serve the enterprise's ECDN content. In addition to making ECDN content available from the edge of the network in this manner, the CDNSP provides a mechanism by which an enterprise may share secure data with its business partner(s) without setting up any special infrastructure.

The foregoing has outlined some of the more pertinent features of the present invention. These features should be construed to be merely illustrative. Many other beneficial results can be attained by applying the disclosed invention in a different manner or by modifying the invention as will be described.

DETAILED DESCRIPTION OF THE PREFERRED EMBODIMENT

As used herein, an "enterprise" refers to some defined set of networks, machines, software, and control functionality. A representative enterprise may be a corporate intranet. A given enterprise typically includes locations that are geographically dispersed but that are interconnected over a given network (e.g., a LAN, WAN or the like). More generally, an "enterprise" is any cognizable legal entity.

As described above, it is known in the art to deliver HTTP, streaming media and applications over an Internet content delivery network (CDN or ICDN). The present invention leverages Internet CDN architecture and functionality such as generally described below.

Figure 1:
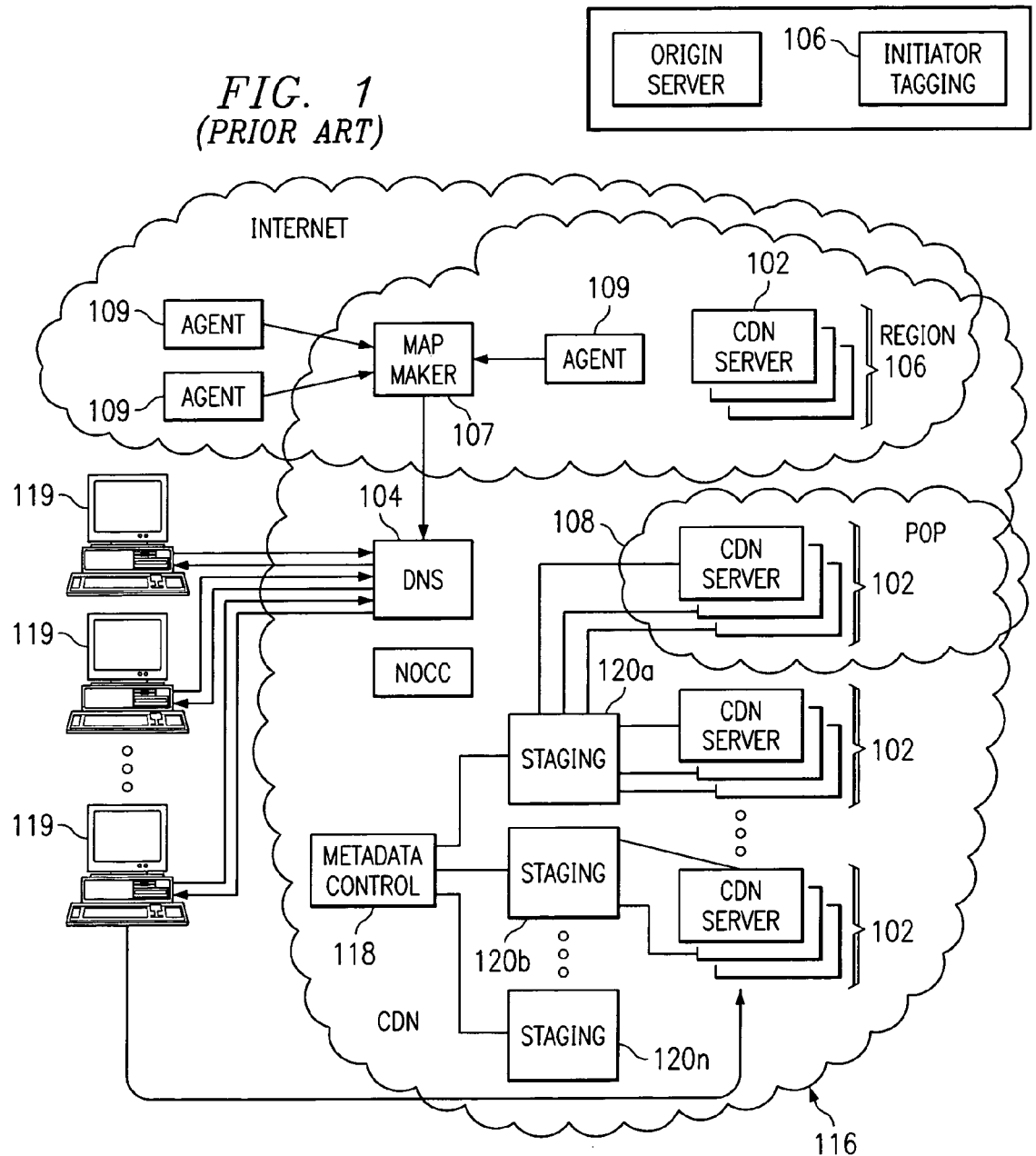
FIG. 1 is a block diagram of a known content delivery network in which the present invention may be implemented.

As seen in FIG. 1, an Internet content delivery infrastructure usually comprises a set of "surrogate" origin servers 102 that are located at strategic locations (e.g., Internet network access points, and the like) for delivering copies of content to requesting end users 119. A surrogate origin server is defined, for example, in IETF Internet Draft titled "Requirements for Surrogates in the HTTP" dated Aug. 9, 2000, which is incorporated herein by reference. The request-routing mechanism 104 allocates servers 102 in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. A CDN service provider (CDNSP) may organize sets of surrogate origin servers as a "region." In this type of arrangement, a CDN region 106 typically comprises a set of one or more content servers that share a common backend, e.g., a LAN, and that are located at or near an Internet access point. Thus, for example, a typical CDN region may be co-located within an Internet Service Provider (ISP) Point of Presence (PoP) 108. A representative CDN content server is a Pentium-based caching appliance running an operating system (e.g., Linux, Windows NT, Windows 2000) and having suitable RAM and disk storage for CDN applications and content delivery network content (e.g., HTTP content, streaming media and applications). Such content servers are sometimes referred to as "edge" servers as they are located at or near the so-called outer reach or "edges" of the Internet. The CDN typically also includes network agents 109 that monitor the network as well as the server loads. These network agents are typically co-located at third party data centers or other locations. Map maker software 107 receives data generated from the network agents and periodically creates maps that dynamically associate IP addresses (e.g., the IP addresses of client-side local name servers) with the CDN regions. In one type of service offering, known as Akamai FreeFlow, from Akamai Technologies, Inc. of Cambridge, Mass., content is tagged for delivery from the CDN using a content migrator or rewrite tool 106 operated, for example, at a participating content provider server. Tool 106 rewrites embedded object URLs to point to the CDNSP domain. A request for tagged content is resolved through a CDNSP-managed DNS to identify a "best" region, and then to identify an edge server within the region that is not overloaded and that is likely to host the requested content. Instead of using content provider-side migration (e.g., using the tool 106), a participating content provider may simply direct the CDNSP to serve an entire domain (or subdomain) by a DNS directive (e.g., a CNAME). In such case, the CDNSP may provide object-specific metadata to the CDN content servers to determine how the CDN content servers will handle a request for an object being served by the CDN. Metadata, as used herein, thus refers to the set of all control options and parameters for the object (e.g., coherence information, origin server identity information, load balancing information, customer code, other control codes, etc.), and such information may be provided to the CDN content servers via a configuration file, in HTTP headers, or in other ways. A configuration file is advantageous as it enables a change in the metadata to apply to an entire domain, to any set of directories, or to any set of file extensions. In one approach, the CDNSP operates a metadata transmission system 116 comprising a set of one or more servers to enable metadata to be provided to the CDNSP content servers. The system 116 may comprise at least one control server 118, and one or more staging servers 120a-n, each of which is typically an HTTP server (e.g., Apache). Metadata is provided to the control server 118 by the CDNSP or the content provider (e.g., using a secure extranet application) and periodically delivered to the staging servers 120a-n. The staging servers deliver the metadata to the CDN content servers as necessary.

Figure 2:
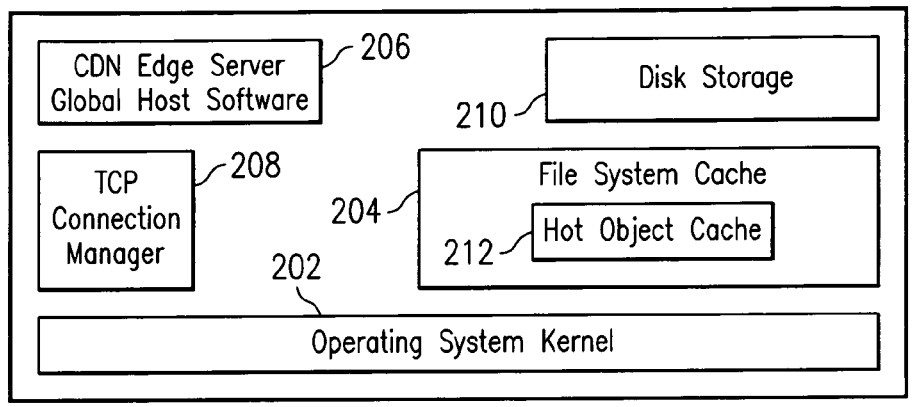
FIG. 2 is a simplified block diagram of a CDN server.

FIG. 2 illustrates a typical machine configuration for a CDN content edge server. Typically, the content server 200 is a caching appliance running an operating system kernel 202, a file system cache 204, CDN global host (or "ghost") software 206, TCP connection manager 208, and disk storage 210. CDN ghost software 206, among other things, is used to create and manage a "hot" object cache 212 for popular objects being served by the CDN. In operation, the content server 200 receives end user requests for content, determines whether the requested object is present in the hot object cache or the disk storage, serves the requested object via HTTP (if it is present) or establishes a connection to another content server or an origin server to attempt to retrieve the requested object upon a cache miss.

According to the invention, servers that handle internal enterprise content (i.e., non publicly-available content) are deployed within or outside an enterprise firewall and are also used as surrogate origin servers for hosting and serving ICDN content. A particular CDN server deployed and managed in this manner may be used to serve (a) enterprise content (in which case it is referred to as an ECDN server with respect to such content) and/or (b) ICDN content (in which case it is referred to an an ICDN server with respect to such content) of behalf of CDN content providers. In a first general embodiment, the CDNSP locates its content server region (comprising one or more content servers, where multiple servers may share a common backend) inside an enterprise's firewall. Thus, for example, the CDN content servers are located on the corporate LAN, perhaps even side-by-side with other servers in the enterprise infrastructure. When such servers are located inside the enterprise firewall, they are ECDN servers but are also deemed to be "ICDN-aware" because, according to the invention, they can be used as surrogate origin servers to serve ICDN content. Thus, in this embodiment, the CDN servers are used to deliver both Internet content otherwise available from the ICDN as well as intranet content that is tagged or otherwise made available for delivery over those servers. In a second general embodiment, the CDNSP locates its content server region topologically (and perhaps geographically) near where the enterprise connects to the Internet but not within the enterprise firewall itself. Thus, for example, CDN content servers are located in the demilitarized zone (DMZ) just outside the corporate firewall or at a nearby (topologically-speaking) network access point. With appropriate authentication and access control in place, these ICDN servers can be used to serve intranet content. As such, these ICDN servers are also "ECDN-aware."

Thus, according to the present invention, ECDN servers within an enterprise firewall are ICDN-aware (and, thus, can act as surrogate origin servers to host and serve ICDN content) while ICDN servers topologically near an enterprise firewall are ECDN-aware (and, thus, can host and serve ECDN content). In a particular embodiment, both ICDN-aware ECDN servers and ECDN-aware ICDN servers are provided, and the CDNSP provides a managed service for the ICDN content/servers and, optionally, for the ECDN content/servers.

An enterprise may include one or more locations such as a central office and one or more remote offices. Conventionally, a remote office is connected to the central office over a private line, which refers to a line not generally routable over the public Internet (e.g., frame relay, satellite link, microwave link, or the like), over a virtual private network (VPN) typically over the public Internet, or in other known ways. In the present invention, the CDNSP extends its ICDN into the enterprise by deploying and managing CDN server regions in the central office and/or regional offices of the enterprise.

According to the invention, the CDNSP has the ability to map and load balance users inside the enterprise as part of the global ICDN, to fetch content from inside the firewall, to collect log information, to deploy software, to distribute live streams, and to provide other ICDN functionality. In an illustrative embodiment, the ICDN deploys a so-called "relay" mechanism or node next to or within the enterprise firewall. This relay node is used as a secure entry point to manage CDN regions on a LAN. In addition, the relay may be used as a conduit to fetch content from inside the LAN, and to act as a gateway for edge-based server side include back-end traffic that needs to be tunneled into the LAN.

Most corporations today either outsource their Domain Name Service (DNS) or run a single centralized DNS server. As a result, the CDNSP cannot readily identify whether a user is located in a particular remote office if a central DNS server is used. To provide effective mapping inside a LAN, the CDNSP provides the corporation (or manages it on the corporation's behalf) with a DNS system that provides each remote office with an identity based on the DNS server IP address that is used for recursive lookups on behalf of users in that office. The methods include: using WCCP to transparently intercept given port traffic on an edge router and direct DNS traffic to a local caching DNS server, and providing a centralized "multi-DNS" that can be configured to identify the user's location by choosing one of multiple addresses to use for a recursive lookup depending on the client IP.

According to one aspect of the invention, the CDNSP provides information security through strong authentication and access control. The goal is to provide an identity based authentication and access control method that is as secure as using a VPN and a firewall to protect sensitive intranet content. Preferably, the owner of the ECDN content controls access to each page or application by listing the users (or groups of users) that are allowed access. This list is then securely distributed to the appropriate CDN servers. Content is then securely distributed to the appropriate ECDN servers and preferably stored in an encrypted format (either push or on demand). A user may theoretically be routed to any CDN server for any content and it is the job of the authentication and access control mechanism to only allow a user to view content and applications to which he or she has been granted access. Preferably, this subsystem has no central point of control or database. Access control is flexible and is provided on a per-group of pages or application basis. Content is fetched securely and stored securely on all CDN servers, and preferably the key is not present on the server so that, even if the server is compromised, no data can be read from disk without obtaining the key from someone else. Preferably, users must have a verifiable identity that can be used to authenticate, and users can only decrypt what they have access to. Authentication is secure from eavesdropping. Further, the CDNSP may implement a secure and efficient back channel for uncacheable requests to be tunneled to the content provider. The authentication and access control have low overhead and are scaleable to tens of thousands of content servers, hundreds of millions of users, and billions of documents. Preferably, the authentication and access control is implemented without using existing VPN technology that requires hardware at the enterprise, or in the network between the user and the server. Thus, in one embodiment, a plug-in is used for the browser/OS that keeps an identity, authenticates to a server, and decrypts data that is received. The access control and management system may be integrated with existing enterprise authentication schemes such as LDAP, or various Microsoft-based protocols.

Further, to offer new services to the enterprise, the CDNSP may also provide an ecosystem around the creation and management of content and applications. To this end, the CDNSP also provides publishing tools, access control management tools, application server environments, and metadata creation and publishing tools, These tools are currently implemented in known CDN architectures and may be extended as follows to facilitate the present invention.

Content on the intranet (namely, "intranet" or so-called ECDN content) most likely is not popular (in the sense that there will be significant demand for such content by multiple users concurrently), and hence it will only need to be published to the appropriate set of CDN servers before users access the content. To this end, the CDNSP may provide application programming interfaces (APIs) to a suitable publishing mechanism. Preferably, the API is integrated into an ICDN application that customers use as well as into existing tools that enterprises use to publish and manage the content on their intranets. Publishing on the LAN may require rate shaping and scheduling to effectively distribute large quantities of data without congesting the network. The CDNSP may also provide the enterprise with an interface to the enterprise's access control management tool, which controls how users access content. This tool is integrated with existing enterprise authentication and identity management tools such as LDAP directory services. In addition, the CDNSP preferably integrates support for edge-based server side include functionality into one or more application server environments (e.g., IBM WebSphere, BEA, Microsoft, Vignette, and others). As noted above, the CDNSP preferably also provides support for metadata publishing and creation.

The following are sample usage scenarios of the many ways an enterprise can deploy and use an Internet content delivery network according to the present invention. These scenarios are merely representative.

Figure 3A:
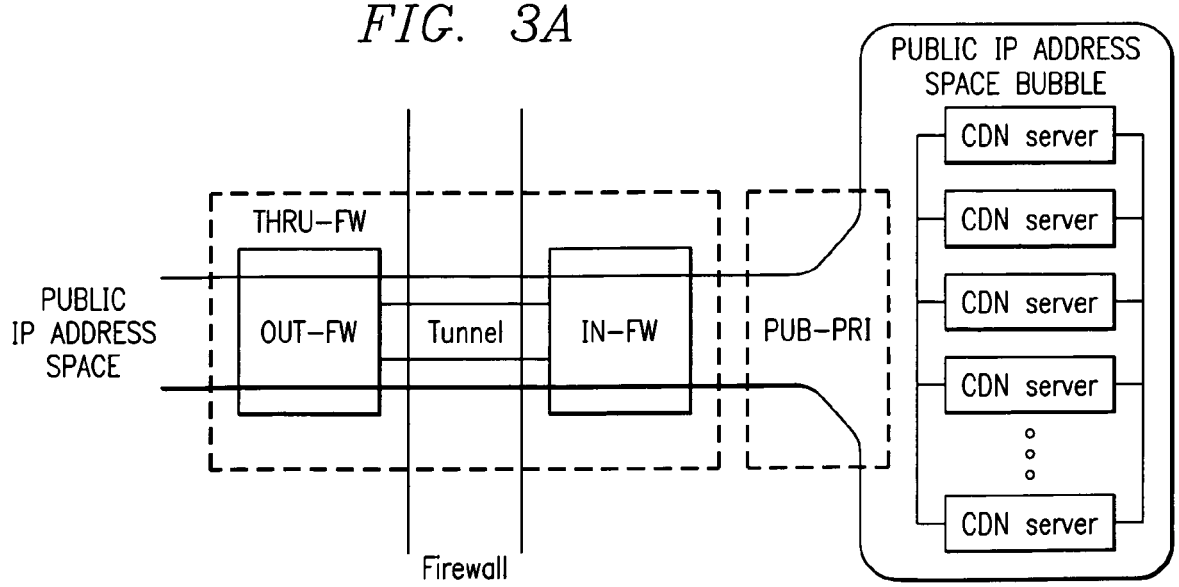
FIG. 3A is a simplified block diagram of a relay mechanism according to the present invention.
Figure 3:
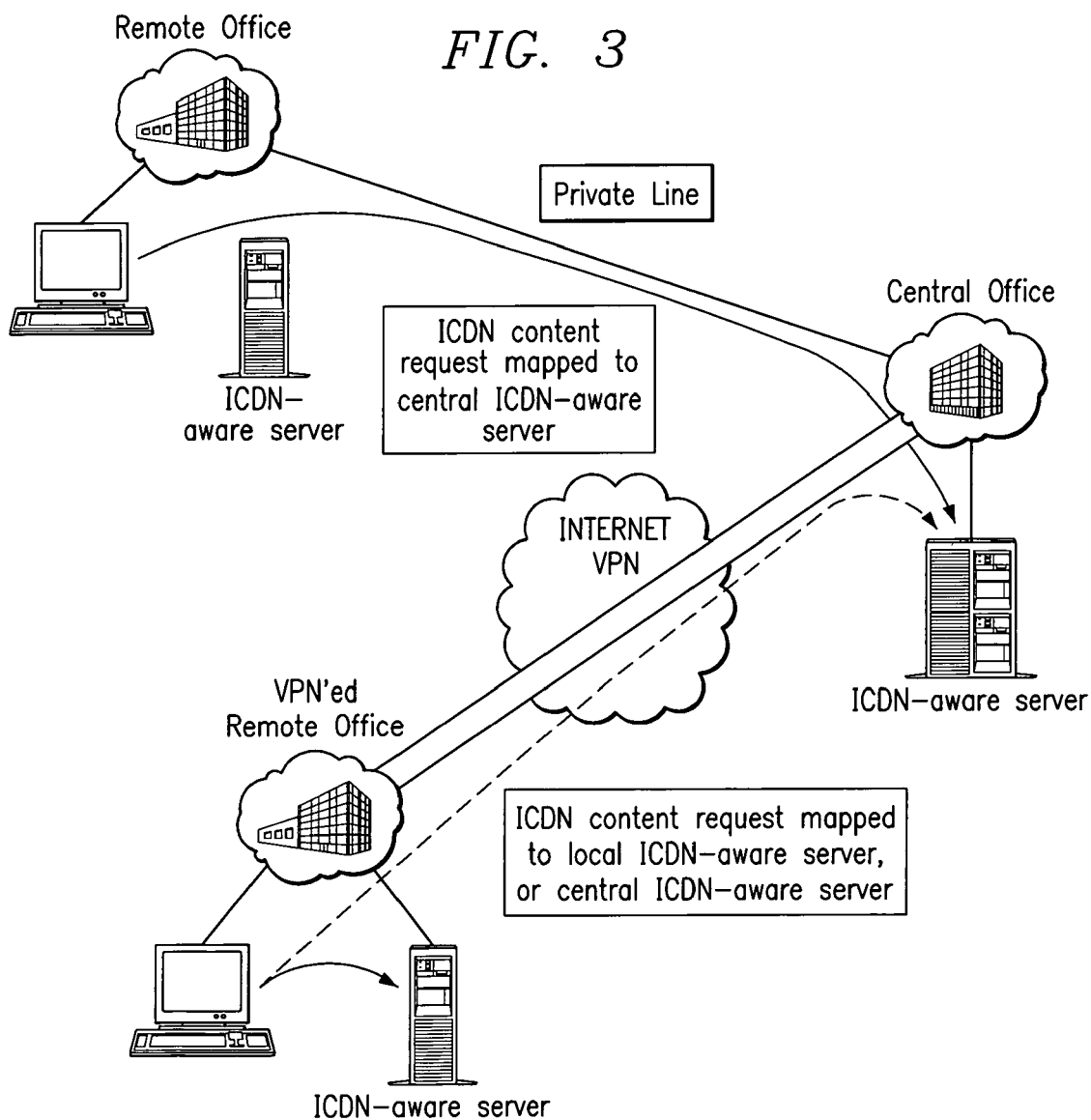
FIG. 3 is a first embodiment of the invention wherein an enterprise deploys ICDN servers and distributes ICDN content from inside an enterprise local area network (LAN)

FIG. 3 is a first embodiment of the invention wherein an enterprise deploys ICDN-aware servers and distributes ICDN content from inside an enterprise local area network (LAN). The configuration of a single central office and a pair of remote offices is merely representative, of course. In this scenario, an enterprise desires to improve the performance of web sites that the CDNSP distributes on behalf of its content provider customers. To this end, the enterprise turns over to the CDNSP Domain Name Service (DNS) operations and the CDNSP preferably deploys a private CDN region at one or more of the remote offices of the enterprise. A region comprises one or more CDN servers, which are illustrated as ICDN-aware servers as these boxes act as surrogate origin servers for the normal publicly available ICDN content. ICDN mapping (using a request routing mechanism) connects users in a remote office with the local ICDN-aware servers, typically, those ICDN servers within the remote office nearest the requesting user. Control signals and data collection from the ICDN regions inside the enterprise firewall are tunneled through the firewall (not shown) by a relay mechanism to the rest of the ICDN global network. The relay mechanism, which is described in more detail below, has two generic functions: it acts as a gateway for metadata and other control signals that are imported from the ICDN and disseminated to the ICDN-aware servers, and it acts as a conduit for exporting back to the ICDN log, usage and state data from the ICDN-aware servers. The relay mechanism preferably is implemented in software running on commodity hardware. It may be a single machine located within the enterprise DMZ, a pair of machines (one within, one without) that create a tunnel through the firewall, a third party trusted service, or an alternate communications link. In effect, the regions that are inside the LAN are operated as a group of private regions. Neither authentication nor access control is required in this scenario. The above solution also provides many of the benefits of caching to the enterprise customer.

FIG. 3A is an illustrative embodiment of the relay mechanism. By way of background, it should be appreciated that a typical enterprise such as illustrated in FIG. 3 is divided into many locations. The different locations may have their own private IP space that may overlap from location to location, or the different locations may all be VPN'ed to have one big private IP space, and traffic emerging from the enterprise onto the Internet may have different sources for different locations or the same source for different locations. In FIG. 3, each ICDN-aware region thus is set up behind the firewall in a private IP space. According to the invention, the CDNSP sets up a "bubble" of public IP space behind the firewall and, in effect, "cocoons" the ICDN-aware region machines in that bubble. As seen in FIG. 3A, this bubble preferably has two interfaces—(1) THRU-FW: an interface to the outside world through the firewall and (2) PUB-PRI: an interface to the other machines behind the firewall that are in their own private IP space. Together, the THRU-FW and PUB-PRI interfaces comprise the relay mechanism.

The major advantage of immersing the ICDN-aware region machines in their own public IP space bubble is that the CDNSP can use its existing systems and software. The ICDN-aware region machines, as with the other surrogate origin servers in the rest of the global CDN, continue to operate unchanged.

The following describes the component parts of FIG. 3A in greater detail. For illustrative purposes, assume the region under consideration is a four (4)-machine region, called Region 1 GE-NY, and assume that the public addresses of the region are 64.0.0.1-64.0.0.4. In this example, these machines are also addressable using private addresses, e.g., 10.0.0.1-

10.0.0.4, with the private address space behind the firewall being 10.0.0.0/24. The THRU-FW interface is implemented by two machines, a machine outside the firewall OUT-FW, and a machine inside the firewall IN-FW. PUB-PRI is a machine between the region and the rest of the enterprise machines inside the firewall. Assume PUB-PRI has a public IP 64.0.0.5 and a private IP 10.0.0.5.

THRU-FW: This is basically a tunnel thru the firewall. In this illustrative example, OUT-FW can be situated in any datacenter to which the addresses 64.0.0.1-64.0.0.4 are routed. IN-FW connects out thru the firewall to OUT-FW. OUT-FW sends any packets it receives addressed to 64.0.0.1-64.0.0.4 and tunnels them to IN-FW. This can be implemented any number of ways—e.g. PPP over stunnel, ipsec, or other VPN software. IN-FW recovers the original packets and puts them out on the front-end of the ICDN region machines. IN-FW sends similarly addressed packets to OUT-FW, which does the same and sends the recovered packets on their way in the Internet. THRU-FW, in addition to being a tunnel, rewrites DNS packets. Thus, for example, whenever the tunnel receives a DNS response packet from a GE-NY machine, it rewrites the 64.0.0.x address with the equivalent 10.0.0.x for x in 1-4. This DNS rewrite may be performed either at IN-FW or OUT-FW, and preferably it is a subset of the functionality of a DNS proxy. IN-FW and OUT-FW are remotely configurable and can be controlled, e.g., through an ssh connection, and it can be queried from the global CDN. This tunnel may be replicated at multiple places on the public Internet for improved fault-tolerance.

PUB-PRI: This is basically a NAT compatible firewall that rewrites packets with destination 10.0.0.x originating on the private side to packets with corresponding 64.0.0.x addresses on the public side and itself as the source, and vice versa. It is possible and may be desirable to combine the IN-FW and PUB-PRI functionalities into one machine. This component preferably is also configurable and can be controlled through an ssh connection.

The following is a typical interaction for ICDN content: The end user behind the firewall navigates his or her browser to the domain of a web site having content that has been tagged for delivery by the ICDN. The browser contacts its nameserver, which then sends out a DNS query to a top level of the ICDN request routing mechanism. The query appears to come from the firewall of GE-NY. The request routing mechanism then directs the browser nameserver to low level name servers in GE-NY 64.0.0.1-64.0.0.4. The nameserver then sends out the query to, say, 64.0.0.1, which leaves the firewall and enters OUT-FW at a given location, say, L3-DC. OUT-FW encrypts the packet and sends it along thru the tunnel to IN-FW, which then reassembles the packet and puts it out on the front end of the GE-NY machines. 64.0.0.1 responds with the IP address of a ICDN-aware machine that has been designated to serve the content, say 64.0.0.2. When this packet reaches IN-FW (this could also happen at the OUT-FW end), it rewrites the content of the DNS packet so that 64.0.0.2 in the payload is converted to 10.0.0.2. This is then returned by the nameserver to the browser, which then sends a HTTP get to 10.0.0.2. This packet now comes into PUB-PRI, which changes the destination IP to 64.0.0.2 and the source to its own 64.0.0.5 source address. When 64.0.0.2 responds to 64.0.0.5, it then rewrites the packet as coming from 10.0.0.2 and sends it to the browser. To summarize— DNS interactions preferably go thru the tunnel while HTTP interactions preferably go thru PUB-PRI. On a cache miss, the ICDN-aware machine can bypass the tunnel and go directly to the origin server thru the firewall, via PUB-PRI, for example.

Figure 4:
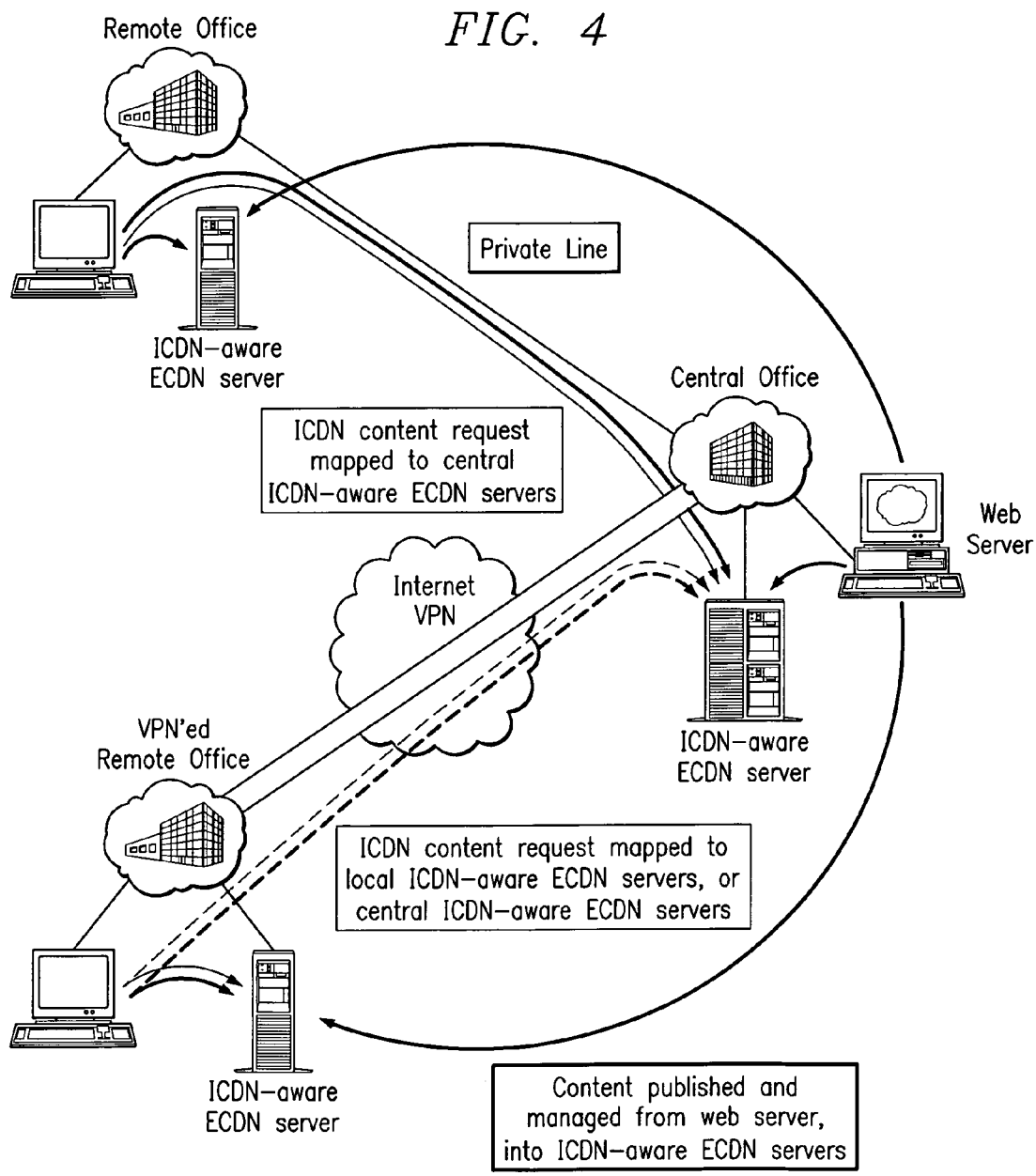
FIG. 4 is a second embodiment of the invention wherein an enterprise deploys ICDN servers and distributes ICDN-tagged content and intranet content and applications inside an enterprise firewall with traditional security methods.

In the FIG. 3A embodiment, the servers are ICDN-aware but (for illustrative purposes only) are not used for ECDN content. This is evident from the arrows in FIG. 3 that indicate that the requests are for ICDN content, namely, content that originates from content providers outside the enterprise firewall and that is generally available over the public Internet. The dashed line in this figure means that the single request could be mapped either to the local ICDN-aware server in the remote office or the ICDN-aware server in the central office. Now, suppose the end user also desires ECDN content. This embodiment is illustrated in FIG. 4, wherein the servers that are positioned behind the enterprise firewall are ICDN-aware ECDN servers in that these servers are useful for both ICDN content and ECDN content. Continuing with the FIG. 3A example, to prevent access of intranet content from outside, preferably the CDNSP blocks all connections from the outside to ports 80/443 on the inside. ECDN content is tagged on a given domain and the enterprise administrator sets up records in the enterprise's local nameservers so that the local CDN region is authoritative for that domain. This causes both DNS and HTTP traffic to transit thru PUB-PRI. IN-FW is set up to ignore DNS queries corresponding to the enterprise's internal domain names while PUB-PRI picks them up and responds using the internal nameservers with 10. addresses. When a ECDN server issues HTTP GETs to access the content on the origin server to 10.0.0.0/24 addresses, PUB-PRI NATs them over.

As noted above, FIG. 4 is a second embodiment of the invention that illustrates the use of ICDN-aware ECDN servers. In this illustration, ECDN content requests are designated by the heavier weight arrows and ICDN content requests are designated by the lighter weight arrows. ECDN content and applications are delivered inside an enterprise firewall with traditional security methods. In this scenario, an enterprise wants to improve not only the performance of web sites that the ICDN delivers, but it also wants to improve the performance of intranet-delivered content. As in the previous scenario, the enterprise hands-over DNS operations to the ICDN, the ICDN deploys an ICDN-aware region in each remote office, and the ICDN controls the regions as part of the ICDN network. To this end, the enterprise is given a domain, say home.foo.com, with a private map that only maps to regions inside of the firewall of the corporation.

Preferably, content on the intranet is tagged for delivery over the ICDN by known methods (including explicit or implicit (CNAME) tagging). Metadata is created and deployed using the ICDN's metadata transmission system. The webmaster of the intranet publishes data to the ICDN-aware regions that are deployed inside the LAN when new content becomes available on the intranet. Existing ICDN logging and tracking tools are used by the webmaster to track usage of content on the intranet. Security of intranet content in this case is provided by the standard method of preventing network access to the ICDN-aware ECDN servers and the origin server that are located inside the LAN. There is no requirement for access control or authentication. In addition, in this embodiment, application front ends may be delivered from ICDN servers by edge-based server-side include or XSLT functionality, which is integrated into the application server front end. Back end traffic need not be encrypted and stays inside the firewall. Database answers preferably are cached as XML on the ICDN servers, and database updates are invalidation events for cached XML.

Figure 5:
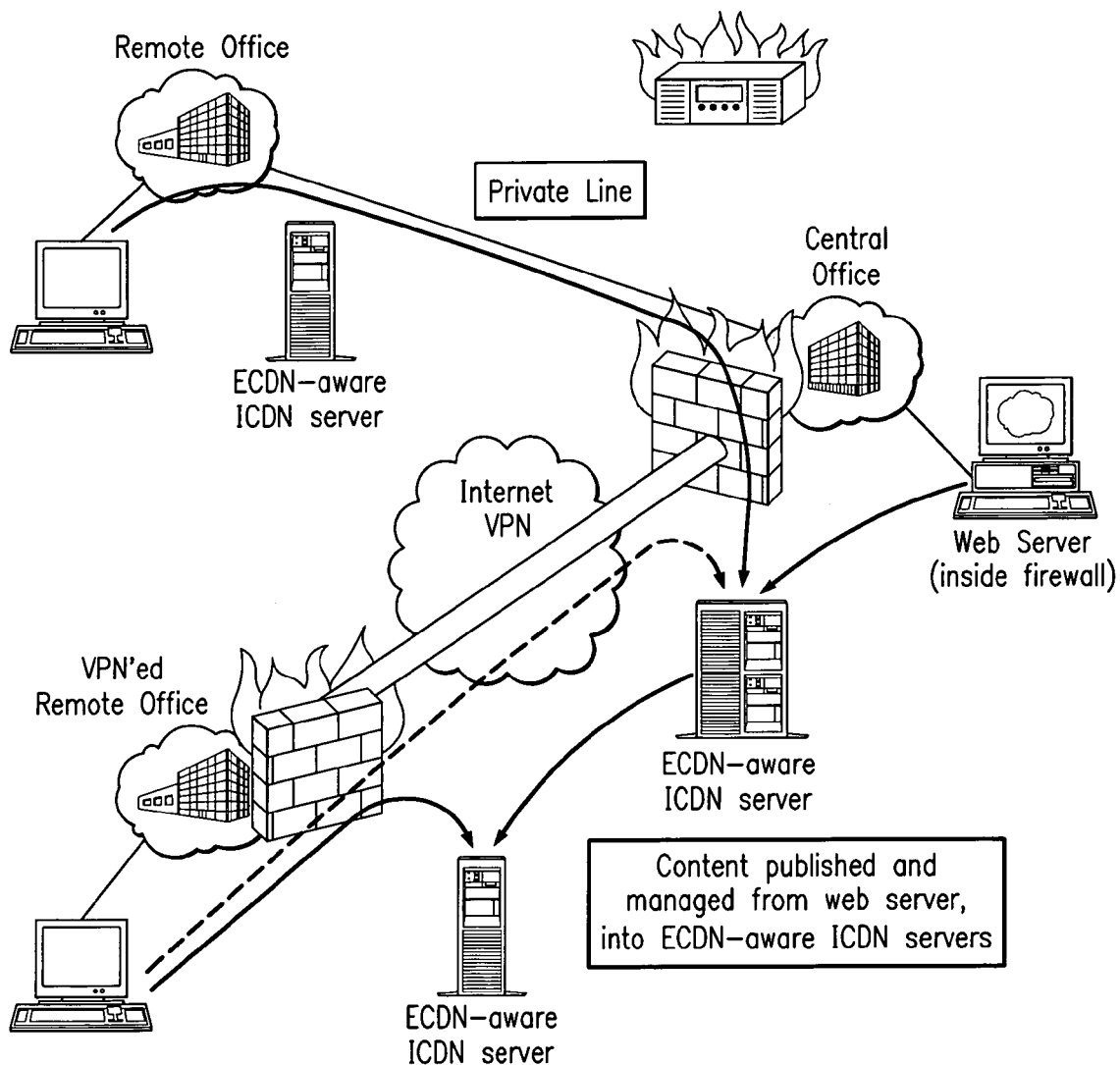
FIG. 5 is a third embodiment of the invention wherein an enterprise distributes intranet content and applications without deploying CDN surrogate origin servers inside the enterprise LAN.

FIG. 5 is a third embodiment of the invention wherein an enterprise distributes intranet content and applications without deploying CDN servers inside the enterprise LAN. In this scenario, an enterprise wants to improve the performance of intranet content and applications for users in remote offices that are connected to the Internet These remote offices may communicate with the central offices with a VPN, but typically there is no dedicated physical network between the offices. The enterprise may not want to deploy CDN servers in each of the regional offices because of space, cost, or other reasons. Instead, it is assumed the enterprise desires to utilize the CDN to serve the intranet content from an node that is located closest to the regional office. A machine located at a node of this type is illustrated in the drawing as being an ECDN-aware ICDN server as the server is a conventional surrogate origin server for serving ICDN content typically located at a public IP address. Generally, the ICDN region or node is topologically (and, potentially, geographically) near where the enterprise connects to the Internet but, as compared to the embodiments shown in FIGS. 2-3, not within the firewall. Thus, for example, the ICDN region (which includes one or more ECDN-aware ICDN servers) is located within the DMZ adjacent the enterprise firewall, directly outside the DMZ (namely, outside a router), at a topologically-near network access point, or the like. Hypothetically, an entity that is not part of the enterprise can access content from the region, although the CDNSP may limit such access. In the embodiments shown in FIGS. 3-4, on the contrary, typically only an end user that is associated with the enterprise can access the intranet content stored on the CDN content servers inside the firewall.

As illustrated, content on the intranet preferably is hosted at the central office web server behind the firewall. The intranet is given a domain, say home.foo.com, which is CNAMEd to an ICDN name that is visible on the ICDN. Metadata is created by existing ICDN methods, and access control is defined for all of the content of the intranet. In this case, preferably only employees of the corporation would be allowed to access content from the intranet. The access control may be more granular, up to groups of pages and specific applications. For example, only the top ten people in the company might be able to access the application that gives the real time cash position of the company, and other such access policies can be implemented using known mechanisms. Content that is added to the intranet, or application data that changes, would be published to a set of ICDN nodes that is selected to be close to the majority of the remote offices of the corporation. Preferably, only encrypted content is published outside of the firewall.

In operation, users in a remote office that look up home. foo.com are mapped to the closest ICDN server that is deployed on the Internet. Metadata for home.foo.com describes which users have access to the content. The ICDN server authenticates the user by interacting with the client and then, only after checking if the user is allowed to view the content, it sends the encrypted content to the client. This interaction would be as or more secure than using an existing VPN system.

If the content needs to be fetched from inside the firewall to be cached at an ICDN edge node, preferably it is fetched over an authenticated and encrypted channel. If content needs to be fetched from inside the LAN (e.g., it was not published, or it has expired), the request is tunneled though the relay mechanism. The relay mechanism preferably has access to the LAN systems behind the firewall, and preferably it encrypts the content before it leaves the enterprise. The content is securely distributed to the edge node and sent to the user. If a remote user is accessing an application front end distributed with server side include/XSLT technology, then the back channel component XML requests preferably are sent to the relay over an encrypted channel. The relay has access to the database front end and preferably encrypts the response before it leaves the enterprise.

Figure 6:
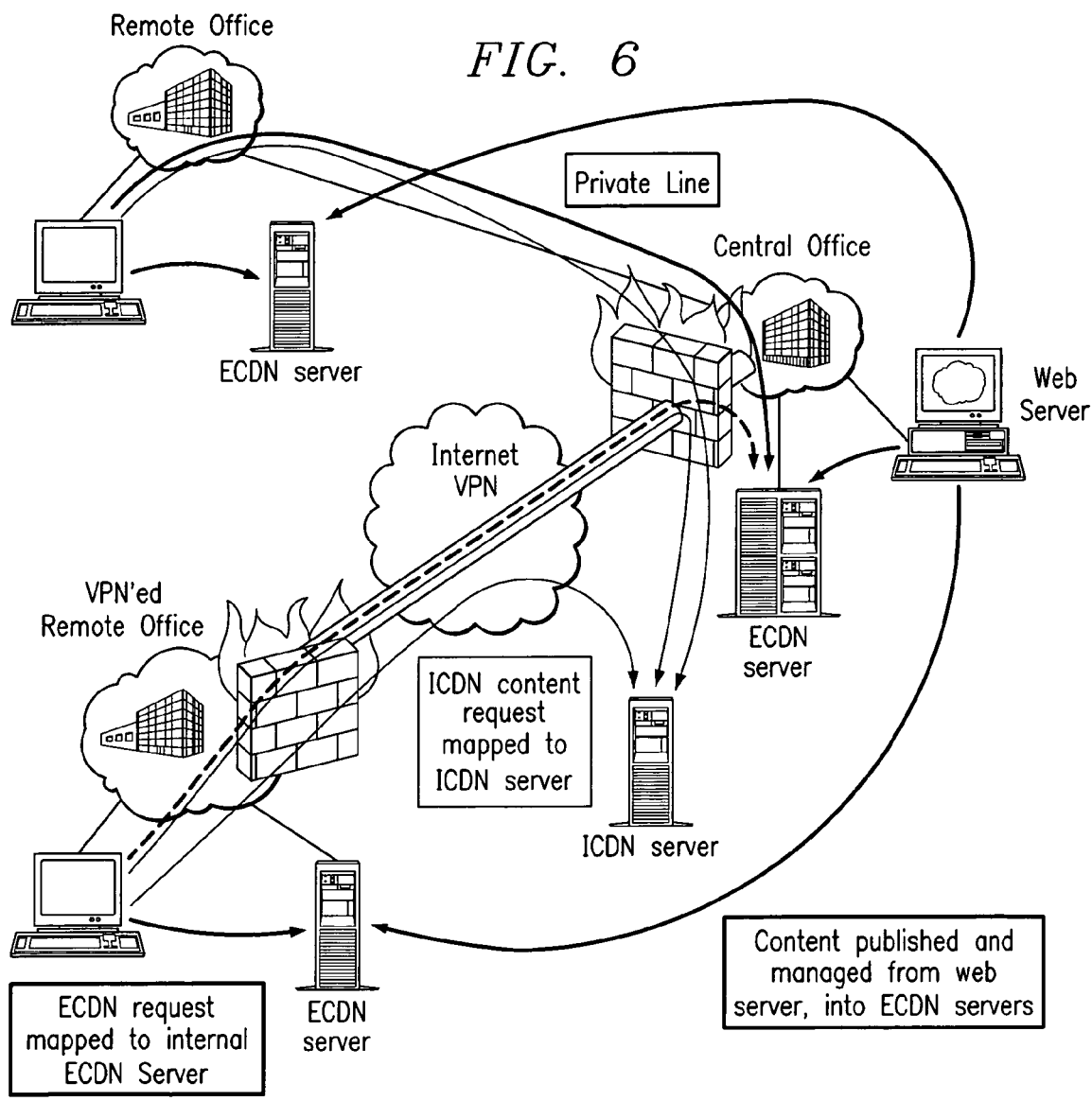
FIG. 6 is a fourth embodiment of the invention wherein an enterprise deploys CDN servers in a central LAN for performance enhancement, and serves intranet content and applications to remote offices from the Internet CDN.

FIG. 6 is a fourth embodiment of the invention wherein an enterprise deploys ECDN servers in a central LAN for performance enhancement, and the enterprise serves intranet content and applications to remote offices from the ICDN. In this case, an enterprise deploys ECDN server regions inside the firewall on the central LAN and in office LANs connected by private lines to the central office LAN. However, the enterprise has remote offices that are not connected by a private WAN to the central office, and the goal is to serve the intranet content and applications to these offices from the ICDN server that is located closest to the remote office. In this case, the method illustrated in FIG. 5 using authentication and encryption works for the whole system. The users inside the central LAN preferably are mapped to the ECDN servers in the LAN, are authenticated, and are served content from inside the LAN. Users in the remote offices are mapped to the closest ICDN server on the Internet and, using the method of the last scenario, they are authenticated and served content.

Another case that could arise here is an application or content section that the enterprise does not want distributed outside of the firewall in any case—either over a VPN or encrypted over the ICDN network. This application can use a special domain name that maps only the servers that are deployed inside the LAN. This is similar to the method illustrated in FIG. 4 above. The separation of security from physical network access affords flexibility to deploy this type of solution. Another related deployment is to serve users from ICDN servers on the corporate LAN when they are in the office, but to serve intranet content and applications to them from ICDN edge servers on the Internet when such users access remotely.

Figure 7:
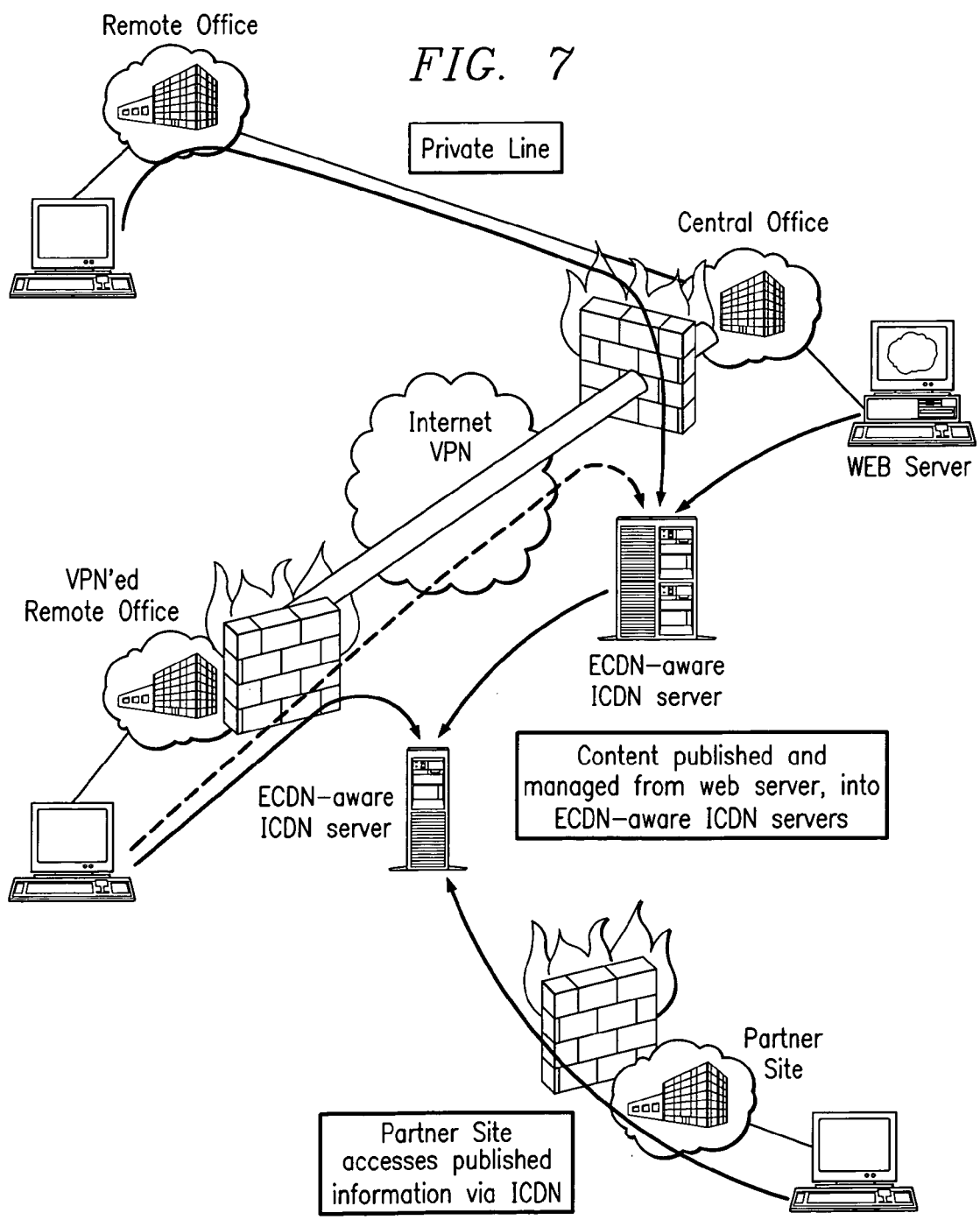
FIG. 7 is a fifth embodiment of the invention wherein an enterprise gives a partner entity access (via the ICDN) to intranet applications and data that the enterprise serves from an intranet content delivery network.

FIG. 7 is a fifth embodiment of the invention wherein an enterprise gives a partner entity access (via the ICDN) to intranet applications and data that the enterprise serves from an intranet content delivery network. This embodiment is similar to that of FIG. 5 except that, in this scenario, an enterprise also wants to allow a business partner to access some of the content and applications that are available on the company's intranet and wants to be sure that the performance is good.

The enterprise provides access controls that allow users in the partner company to access the content and applications that are to be shared. The content and applications preferably are deployed on a domain that is visible on the ICDN DNS request routing mechanism. Users in the partner company are mapped to the closest ECDN-aware ICDN edge server, are authenticated, and are served the content or application front end. As in the previous scenarios, content is stored and fetched securely and SSI/XSLT back channel information is tunneled securely to the corporate LAN. Also similar to previous examples, content from the shared applications and content is published to nodes that are close to the partner offices. With previous notions of security, a private line would have been set up between the two enterprises and firewalls would have been configured to give access to the servers for the applications and content that is to be shared. This is expensive and complex. The above solution is elegant and can be a huge cost savings for the enterprise.

The above has described several embodiments illustrating how an enterprise or a CDNSP implement ICDN and ECDN content delivery both within and without an enterprise firewall. Thus, according to the present invention, ECDN servers within an enterprise firewall are ICDN-aware (and, thus, can act as surrogate origin servers to host and serve ICDN content) while ICDN servers topologically near an enterprise firewall are ECDN-aware (and, thus, can host and serve ECDN content). In a particular embodiment, both ICDN-aware ECDN servers and ECDN-aware ICDN servers are provided, and the CDNSP provides a managed service for the ICDN content/servers and, optionally, for the ECDN content/servers.

As noted above, requesting end users are mapped to deployed ECDN servers via the ICDN request routing mechanism. In the first instance, the CDNSP needs to ensure that no external user ever attempts to access any ECDN server (even though the attempt would fail, because the IP address is internal). Preferably, this is achieved by privatizing the ECDN regions. With respect to mapping, a first and preferred choice is to map each internal enterprise user to the ECDN region that is closest to them. There are several ways to do this. In one approach, the enterprise IT administrator provides the CDNSP with a specification of the enterprise's internal network topology, which is then hardcoded in a VIP map. Alternatively, the CDNSP may periodically test the origin server and several ECDN server regions. The request routing mechanism then chooses the ECDN server region that responds first.

Authentication and access control are facilitated using mechanisms that are well known in the art. Thus, for example, the CDNSP, the enterprise, and/or a third party may implement a key management infrastructure (KMI) that provides easy to use facilities for secure generation, distribution and management of arbitrary keys (e.g., ASCII certificates, SSH keys, edge server SSL certificates, or the like). The components of a key management infrastructure typically include a key signing/generation module, a key escrow module, an audit server, a key distribution center (KDC) mechanism and a KDC database. The enterprise may issue to the CDNSP appropriate keys and the CDNSP then manages those keys on behalf of the enterprise. Or, the enterprise may control the key generation and provide the keys to the CDNSP on an as-needed basis and in a manner that prevents those keys from ever being stored on the ECDN disk in an unencrypted manner.

The present invention provides numerous advantages. The CDN content servers are deployed as a region behind (i.e., within) an enterprise's corporate firewall and used to deliver Internet content. Alternatively, or in addition, CDN content servers are deployed in region(s) located outside an enterprise firewall with strong authentication and access control such that intranet content can be served from those regions. In particular, the current approach is to deploy a firewall and to have servers from an intranet application behind the firewall. Users on the corporate LAN access the servers by direct access, and remote offices access the servers over a virtual private network (VPN). The combination of VPN and firewall is the standard of security for IT organizations presently. In the ICDN for intranet content delivery embodiment where CDN servers are outside the corporate firewall, preferably security is built through authentication and access control, which allows the ICDN to separate the notion of what server a particular user connects to from what content the user is allowed to view. If desired, the ICDN can still provide security through physical network access by creating a private map that maps all internal LAN users to the ICDN nodes deployed inside the firewall protected enterprise.

The notion of security described above allows great flexibility in providing enterprise services and for sharing of applications and data between enterprises. The ICDN can provide enterprise intranet content distribution using its existing ICDN infrastructure. A remote office that has Internet connectivity may then obtain good server from the CDN server node deployed nearby on the Internet. Likewise, the ICDN can allow enterprises to share applications and data on each other's intranet. Users in each corporation connect to the closest ICDN server, which may be inside the enterprise or may be deployed on the Internet near the enterprise.

Authentication and access control determine what content and applications each company can access from the other. Good authentication and access control separates deployment of ICDN nodes inside the enterprise firewall from issues of security, and LAN deployment becomes solely an issue of performance for Internet, intranet, and partner content and applications. An enterprise can still make use of ICDN intranet and application distribution services without deploying any servers inside the firewall, and enterprises can share data without requiring special physical network connections for security and performance.

The invention claimed is:

1. A method operative in an Internet content delivery network (ICDN) having a set of content servers organized into regions and that provides delivery of Internet content on behalf of participating content providers, wherein the Internet content delivery network is managed by an Internet content delivery network service provider distinct from the participating content providers, comprising:

having the Internet content delivery network service provider establish a set of one or more enterprise CDN regions outside but within or electronically close to a demilitarized zone (DMZ) associated with a firewall of an enterprise, wherein each enterprise CDN region has one or more surrogate origin servers, wherein the set of one or more enterprise CDN regions are managed by the Internet content delivery network service provider as part of the ICDN, and wherein a given surrogate origin server in an enterprise CDN region is adapted to host both Internet content that has been tagged by at least one participating content provider for delivery over the ICDN and intranet content that has been tagged by the enterprise for delivery over the ICDN;

responsive to a request for given Internet or intranet content originating from an end user within the enterprise, mapping the end user to a preferred enterprise CDN region that is likely to host the given Internet or intranet content;

serving the given Internet or intranet content from the preferred enterprise CDN region; and responsive to a DNS query or connection request originating from outside the enterprise and associated with a piece of intranet content that has been tagged by the enterprise for delivery over the ICDN, preventing the DNS query or connection request from being processed within a enterprise CDN region to restrict access to the piece of intranet content from the enterprise CDN region.

2. The method as described in claim 1 wherein the set of one or more enterprise CDN regions are managed in part by importing control data from the Internet content delivery network (ICDN) into the enterprise CDN regions to determine how the given Internet content is to be handled on the surrogate origin servers within the enterprise CDN region.

3. The method as described in claim 1 wherein the set of one or more enterprise CDN regions are managed in part by exporting given data from one or more of the enterprise CDN regions to the ICDN, wherein the given data is selected from log, usage and state data.

4. The method as described in claim 1 further including the step of publishing the given intranet content to the enterprise CDN region from a given location in the enterprise.

5. The method as described in claim 1 wherein each enterprise CDN region is identified using a public IP address space.

6. A method operative in an Internet content delivery network (ICDN) having a set of content servers organized into regions and that provides delivery of Internet content on behalf of participating content providers, wherein the Internet content delivery network is managed by an Internet content delivery network service provider distinct from the participating content providers, comprising:

having the Internet content delivery network service provider establish a set of one or more enterprise CDN regions outside but within or electronically close to a demilitarized zone (DMZ) associated with a firewall of an enterprise, wherein each enterprise CDN region has one or more servers and is identified by a public IP address, wherein the set of one or more enterprise CDN regions are managed by the Internet content delivery network service provider as part of the ICDN, and wherein a given server in an enterprise CDN region is adapted to host both Internet content that has been tagged by at least one participating content provider for delivery over the ICDN and intranet content that has been tagged by the enterprise for delivery over the ICDN;

responsive to a request for given Internet or intranet content originating from an end user within the enterprise, mapping the end user to a preferred enterprise CDN region that is likely to host the given Internet or intranet content;

serving the given Internet or intranet content to the requesting end user; and responsive to a DNS query or connection request originating from outside the enterprise and associated with a request for a piece of intranet content that has been tagged by the enterprise for delivery over the ICDN, preventing the DNS query or connection request from being processed within an enterprise CDN region to restrict access to the piece of intranet content from the enterprise CDN region.

7. The method as described in claim 6 wherein a given server within an enterprise CDN region is an ICDN-aware ECDN server.

8. A method operative in an Internet content delivery network (ICDN) having a set of surrogate origin servers that provide delivery of Internet content on behalf of participating content providers, wherein the Internet content delivery network is managed by an Internet content delivery network service provider distinct from the participating content providers, comprising:

having the Internet content delivery network service provider locate at least one ICDN-aware server outside but within or electronically close to a demilitarized zone (DMZ) associated with a firewall of an enterprise, wherein the at least one ICDN-aware server is managed by the Internet content delivery network service provider as part of the ICDN, and wherein a given ICDN-aware server is adapted to host both Internet content that has been tagged by at least one participating content provider for delivery over the ICDN and intranet content that has been tagged by the enterprise for delivery over the ICDN;

associating the at least one ICDN-aware server with a public IP address irrespective of its location within the enterprise firewall;

responsive to a request for given Internet or intranet content originating from an end user within the enterprise, selectively mapping the end user to the ICDN-aware server to enable the end user to attempt to retrieve the given Internet or intranet content;

serving the given Internet or intranet content from the ICDN-aware server; and responsive to a DNS query or connection request originating from outside the enterprise and associated with a request for a piece of intranet content that has been tagged by the enterprise for delivery over the ICDN, preventing the DNS query or connection request from being processed to restrict access to the piece of intranet content from the ICDN-aware server.

* * * * *